US 7,426,277 B2

(12) United States Patent
Kimura

(10) Patent No.: US 7,426,277 B2
(45) Date of Patent: Sep. 16, 2008

(54) ENCRYPTION OF INFORMATION INPUT TO PORTABLE CARD TERMINAL USING ENCRYPTION KEY INFORMATION ASSOCIATED TO PORTABLE CARD TERMINAL IDENTIFIER

(75) Inventor: Akira Kimura, Tokyo (JP)

(73) Assignee: Sony Corporation (JP)

( * ) Notice: Subject to any disclaimer, the term of this patent is extended or adjusted under 35 U.S.C. 154(b) by 954 days.

(21) Appl. No.: 10/082,186

(22) Filed: Feb. 26, 2002

(65) Prior Publication Data

US 2002/0129250 A1 Sep. 12, 2002

(30) Foreign Application Priority Data

Feb. 27, 2001 (JP) ............... P2001-052770

(51) Int. Cl.
  *H04L 9/12* (2006.01)
  *H04K 1/00* (2006.01)
  *G06F 7/04* (2006.01)
(52) U.S. Cl. ............... 380/278; 713/172; 713/185; 726/9; 726/20
(58) Field of Classification Search .......... 713/185, 713/172, 168; 380/278; 726/9, 20
  See application file for complete search history.

(56) References Cited

U.S. PATENT DOCUMENTS

| 4,578,530 | A | * | 3/1986 | Zeidler ...................... 705/1 |
| 4,962,531 | A | * | 10/1990 | Sipman et al. ............... 705/65 |
| 5,276,314 | A | * | 1/1994 | Martino et al. ............. 340/5.27 |
| 5,880,769 | A | * | 3/1999 | Nemirofsky et al. ......... 725/139 |
| 5,917,168 | A | * | 6/1999 | Nakamura et al. ........... 235/379 |
| 5,919,091 | A | * | 7/1999 | Bell et al. ...................... 463/25 |
| 6,193,152 | B1 | * | 2/2001 | Fernando et al. ............ 235/380 |
| 6,195,698 | B1 | * | 2/2001 | Lillibridge et al. .......... 709/225 |
| 6,286,099 | B1 | * | 9/2001 | Kramer ...................... 713/172 |
| 6,584,444 | B1 | * | 6/2003 | Tello et al. ..................... 705/1 |
| 6,715,078 | B1 | * | 3/2004 | Chasko et al. ............... 713/193 |
| 2002/0012433 | A1 | * | 1/2002 | Haverinen et al. .......... 380/247 |

FOREIGN PATENT DOCUMENTS

JP 2000-332748 11/2000

OTHER PUBLICATIONS

Schneier, Bruce. Applied Cryptography. 1996. John Wiley & Sons. pp. 170-178.*
Glazner, Lon. Storing Data with the RAMPACK B. Feb. 1999.*
Schneier, Bruce. Applied Cryptography. John Wiley & Sons. 1996. pp. 33-34.*

\* cited by examiner

*Primary Examiner*—Emmanuel L Moise
*Assistant Examiner*—Michael Pyzocha
(74) *Attorney, Agent, or Firm*—Rader Fishman & Grauer PLLC; Ronald P. Kananen

(57) ABSTRACT

An authentication system in which unauthorized acquisition of the private information by a third party in the course of authentication of a user by a service provider is rendered difficult. In an authentication system in which a card 10 and a host computer 20 are interconnected over a connection line 30, the card 10 includes a memory for ID 11 for storing the card ID, an input unit 12 fed with a secret identification number, a card side interface 13 connected to the host computer 20, an information encryption unit 14 for generating the information for authentication by mixing a random number, sent from the host computer 20 and having a unique value each time it is sent, with the secret identification number of the card, and by encoding the resulting mixed signal, and a transient storage unit 15 for transiently storing the information for authentication as obtained by the information encryption unit 14.

30 Claims, 7 Drawing Sheets

ENCRYPTION OF INFORMATION INPUT TO PORTABLE CARD TERMINAL USING ENCRYPTION KEY INFORMATION ASSOCIATED TO PORTABLE CARD TERMINAL IDENTIFIER

BACKGROUND OF THE INVENTION

1. Field of the Invention

This invention relates to an authentication system and method, an identification information inputting method and apparatus and a portable terminal. More particularly, it relates to an authentication system and method which, in the process of a service provider authenticating a user, render unauthorized acquisition of the personal information on the user by a third party difficult. This invention also relates to an identification information inputting method and apparatus and a portable terminal which, in the process of a user inputting an encryption key, render unauthorized acquisition of the personal information on the user by a third party difficult.

2. Description of Related Art

Heretofore, in recognizing whether or not a user is authorized to exploit a given service entity, a method has basically been used in which a service provider issues a physical ticket or a member's card for the user in advance and, at the point in time of the user exploiting the service, the ticket or the member's card is checked by way of performing the authentication.

For example, in a credit sale system, typified by a credit card sale system, the service provider identifies a user by the card information recorded on a card presented by the user, that is, the personal information, in order to carry out credit trading. In this case, the user is authenticated by simply causing a card reader to read the credit card owned by the user.

On the other hand, a so-called debit payment system in which the debit has the opposite meaning to that of credit is also becoming accepted as being among the various payment methods. In the debit payment service, a user inserts a bank cashing card in a sale point information management terminal, or point-of-sale (POS) terminal, and enters a secret identification number and amount. In this case, the charge is instantly transferred from the user's account by way of performing a liquidation.

Also, with the coming into widespread use of the Internet, a user is able to purchase goods through the Internet and to make corresponding payments. For example, the user is able to make payment on simply transmitting the preset information of a credit card to the service provider.

The present Assignee has already proposed encrypting a key signal using a random number for preventing unauthorized use (Japanese Laying-Open Patent Publication 2000-332748).

However, the above-described payment methods are low in reliability for a authentication procedure, such that acquisition by a third party of the card information may occur at any point in time in the process of the authentication procedure.

For example, the authentication procedure by a credit card simply resides in causing the card reader to read-in the card. When shopping in a store and using a credit card for payment, the user hands his or her credit card to a sales clerk for the payment procedure. At this time, the sales clerk is able to cause another card readercapable of holding the credit card information to read-in the card information, while being able to exchange willfully the card with another one. That is, the risk is high that the personal information stored in the card may be illicitly acquired (skimmed) by a third party.

In the case of the Internet, in particular, it may be a frequent occurrence that payment may be finished simply by the user transmitting the preset information stated on the credit card to the service provider. Up to now, there was the risk that the credit card information could be intercepted and stolen by a third party in the communication process. Moreover, in the case of the Internet, there is no direct contact between the service provider and the user, so that there is the risk that a third party could feign being the card owner in the communication process for payment and make an unauthorized false payment or could adulterate payment data, thus lowering reliability.

Also, in debit payment, a caching card is inserted into a POS terminal. Since the user inputs a secret identification number via input means in the POS terminal, the number may be illicitly acquired by a third party in the case where the input means, etc., of the POS terminal is willfully modified. On the other hand, should there be no physical screening means around the POS inputting means, a third party may be in a position to acquire illicitly the secret identification number by simply and secretly peeping at the figures of the numbers being input by the user. Moreover, if the secret identification number is skimmed, stolen or exchanged with another one, there is the risk that the card can be repeatedly used in an unauthorized manner until this state is recognized by the card owner.

Although there is known a technique of encrypting the key number by a random number, as described in the aforementioned Japanese Laying-Open Patent Publication 2000-332748, there is not a service system that is improved so that skimming of the secret identification number of the card may be prevented.

The above-described servicing system suffers from many drawbacks in connection with reliability, such that, if this problem is seen in the perspective of a business, the user may feel anxious about its safe service utilization due to this flaw in operational reliability. As a result, the number of users may not increase as expected, despite the fact that a large installment investment is needed for POS equipment, thus leading to low profitability for the business.

In view of the above-described prior art technique, it is an object of the present invention to provide an authentication system and method which, in the process of the service provider authenticating a user, render it difficult for a third party to acquire illicitly the user's personal information.

It is another object of the present invention to provide an identification information inputting method and apparatus which, in the process of the user inputting identification information, render it difficult for a third party to acquire illicitly the user's personal information.

It is still another object of the present invention to provide a portable terminal which, in the course of the user inputting identification information, renders it difficult for a third party to acquire illicitly the user's personal information.

It is a further object of the present invention to provide an authentication system and method, an identification information inputting method and apparatus and a portable terminal which remove the marked apprehension entertained by users at large about service exploitation, increase the number of latent users and improve the profitability of business.

SUMMARY OF THE INVENTION

In one aspect, the present invention provides an authentication system made up by a portable terminal and an authentication device provided independently of the portable terminal for communication with the portable terminal. The authentication system includes first identification information storage means having the first identification information pre-stored therein for discriminating the portable terminal, operating means for inputting the second identification information associated with the first identification information, encryption means for encrypting the second identification information input by the operating means based on the preset encryption key generating information, and first communication means for communication with the authentication device. The authentication device includes second identification information storage means for storage of the first identification information and the second identification information therein, encryption key generating means for generating the encryption key generating information, second communication means for communication with the portable terminal and comparator authentication means for comparing the second identification information encrypted by the encryption means to the encryption key generating information by way of performing the authentication.

Preferably, the portable terminal encrypts the second identification information input from the operating means based on the encryption key generating information received from the authentication device through the first communication means, and the so encrypted second identification information is transmitted through the first communication means to the authentication device. In the authentication device, the encrypted second identification information received through the second communication means and the second identification information stored by the second identification information storage means are compared to the encryption key generating information by way of performing the authentication.

With the authentication system of the present invention, it is difficult for a third party to acquire the user's private information in an unauthorized fashion in the process until the service provider authenticates the user.

In particular, when the authentication system of the present invention is applied to a credit sale system and to an inter-account instant payment carried out over the dedicated network or to E-commerce carried out over an optional network, such as the Internet, it is possible to improve interception properties when the user inputs the secret identification number as a letter string.

Moreover, with the authentication system according to the present invention, since the marked apprehension entertained by users at large about the reliability in card exploitation may be removed, the number of users of the credit sale system employing a card, an inter-account instant payment system employing a cash card, and E-commerce carried out over an optional network, such as the Internet, may be increased, thus enlarging the market while improving the profitability of business.

In another aspect, the present invention provides an authentication method which includes an operating step of inputting the second identification information associated with the first identification information for discriminating a portable terminal, pre-stored in first identification information storage means, an encryption key generating information generating step of generating the encryption key generating information, an encrypting step of encrypting the second identification information input at the operating step, based on the encryption key generating information generated in the encryption key generating information generating step, and a comparison authentication step of comparing the second identification information encrypted in the encrypting step based on the encryption key generating information and performing the authentication.

With the present authentication method, the second identification information input in the operating step is encrypted in the encrypting process based on the encryption key generating information. The so-encrypted second identification information is compared to the second identification information stored in the second identification information storage means and performs the authentication.

With the authentication method of the present invention, it is difficult for a third party to acquire the user's private information in an unauthorized fashion in the process until the service provider authenticates the user.

In particular, when the authentication method of the present invention is applied to a credit sale system and to an inter-account instant payment carried out over the dedicated network or to E-commerce carried out over an optional network, such as the Internet, it is possible to improve interception properties when the user inputs the secret identification number as a letter string.

Moreover, with the authentication method according to the present invention, since the marked apprehension entertained by users at large about the reliability in card exploitation may be removed, the number of latent users of a credit sale system employing a card, an inter-account instant payment system employing a cash card, and E-commerce carried out over an optional network, such as the Internet, is increased, thus enlarging the market while improving the profitability of business.

In another aspect, the present invention provides an identification information inputting device in which a string of a preset number of letters comprised of a combination of letters included in a preset group of letters is a letter string for authentication. The device includes display means for irregularly displaying the letters included in the preset group of letters and selection means for selecting the letter string for authentication from among the letters irregularly displayed on the display means.

In the present identification information inputting device, the letters forming the letter string for authentication are selected in the selection means from among the letters included in the preset group of letters irregularly displayed on the display means.

In the above identification information inputting device, the letters making up the letter string for authentication are selected by selection means from among the letters included in the group of letters irregularly displayed in the display means.

With the above identification information inputting device of the present invention, it is difficult for a third party to acquire the user's private information in an unauthorized fashion in the process until the service provider authenticates the user.

In particular, when the identification information inputting device of the present invention is applied to a credit sale system and to an inter-account instant payment carried out over the dedicated network or to the E-commerce carried out over an optional network, such as the Internet, it is possible to improve interception properties when the user inputs the secret identification number as a letter string for authentication.

Moreover, with the identification information inputting device according to the present invention, since the uneasiness entertained by users at large about the reliability in card exploitation may be removed, the number of users of the credit sale system employing a card, an inter-account instant payment system employing a cash card, and E-commerce carried out over an optional network, such as the Internet, is increased, thus enlarging the market while improving the profitability of business.

In another aspect, the present invention provides an identification information inputting method which includes a display step of irregularly displaying the letters included in the preset group of letters and a selection step of selecting the letter string for authentication from among the letters irregularly displayed in the display step.

In the present identification information inputting method, the letters forming the letter string for authentication are selected in the selection means from among the letters included in the preset group of letters irregularly displayed on the display means.

With the identification information inputting method of the present invention, it is difficult for a third party to acquire the user's private information in an unauthorized fashion in the process until the service provider authenticates the user.

In particular, when the identification information inputting method of the present invention is applied to a credit sale system and to an inter-account instant payment carried out over the dedicated network or to the E-commerce carried out over an optional network, such as the Internet, it is possible to improve interception properties when the user inputs the secret identification number as a letter string for authentication.

Moreover, with the identification information inputting method according to the present invention, since the uneasiness entertained by users at large about the reliability in card exploitation may be removed, the number of latent users of the credit sale system employing a card, an inter-account instant payment system employing a cash card, and E-commerce carried out over an optional network, such as the Internet, is increased, thus enlarging the market while improving the profitability of business.

In another aspect, the present invention provides a portable terminal authenticated by an authentication device, including first identification information storage means having the first identification information for discriminating the portable terminal pre-stored therein, operating means for inputting the second identification information associated with the first identification information, communication means for communication with the authentication device and encrypting means for encrypting the second identification information input by the operating means based on preset encryption key generating information sent over the communication means from the authentication device.

In the present portable terminal, the second identification information associated with the first identification information input at the operating means is encrypted by the encrypting means based on the preset encryption key generating information sent over the communication means from the authentication device.

With the portable terminal of the present invention, it is difficult for a third party to acquire the user's private information in an unauthorized fashion in the process until the service provider authenticates the user.

In particular, when the portable terminal of the present invention is applied to a credit sale system and to an inter-account instant payment carried out over the dedicated network or to the E-commerce carried out over an optional network, such as the Internet, it is possible to improve interception properties when the user inputs the secret identification number as a letter string for authentication.

Moreover, with the portable terminal according to the present invention, since the uneasiness felt by users at large about the reliability in card exploitation may be removed, the number of users of the credit sale system employing a card, an inter-account instant payment system employing a cash card, and E-commerce carried out over an optional network, such as the Internet, is increased, thus enlarging the market while improving the profitability of business.

In yet another aspect, the present invention provides an authentication system made up by a portable terminal and an authentication device provided independently of the portable terminal for communication with the portable terminal. The authentication system includes first identification information storage means having the first identification information pre-stored therein for discriminating the portable terminal, operating means including display means for irregularly displaying letters included in a group of letters and selection means for selecting the letters making up the second identification information from among the letters irregularly displayed on the display means, the operating means inputting the second identification information associated with the first identification information, encryption means for encrypting the second identification information input by the operating means based on the preset encryption key generating information and first communication means for communication with the authentication device. The authentication device includes second identification information storage means having the first identification information and the second identification information stored therein, encryption key generating information generating means for generating the encryption key generating information, second communication means for communication with the portable terminal and comparator authentication means for comparing and authenticating the second identification information encrypted by the encryption means based on the encryption key generating information.

In the above authentication system, the portable terminal encrypts the second identification information input from the operating means based on the encryption key generating information received from the authentication device, and the so-encrypted second identification information is transmitted through the first communication means to the authentication device. In the authentication device, the encrypted second identification information received through the second communication means and the second identification information stored by the second identification information storage means are compared to the encryption key generating information and performing the authentication.

With the authentication system of the present invention, it is difficult for a third party to acquire the user's private information in an unauthorized fashion in the process until the service provider authenticates the user.

In particular, when the authentication system of the present invention is applied to a credit sale system and to an inter-account instant payment carried out over the dedicated network or to E-commerce carried out over an optional network, such as the Internet, it is possible to improve interception properties when the user inputs the secret identification number as a letter string for authentication.

Moreover, with the authentication system according to the present invention, since the uneasiness felt by users at large about the reliability in card exploitation may be removed, the number of latent users of the credit sale system employing a card, an inter-account instant payment system employing a cash card, and E-commerce carried out over an optional network, such as the Internet, is increased, thus enlarging the market while improving the profitability of business.

DESCRIPTION OF THE PREFERRED EMBODIMENTS

Figure 1:
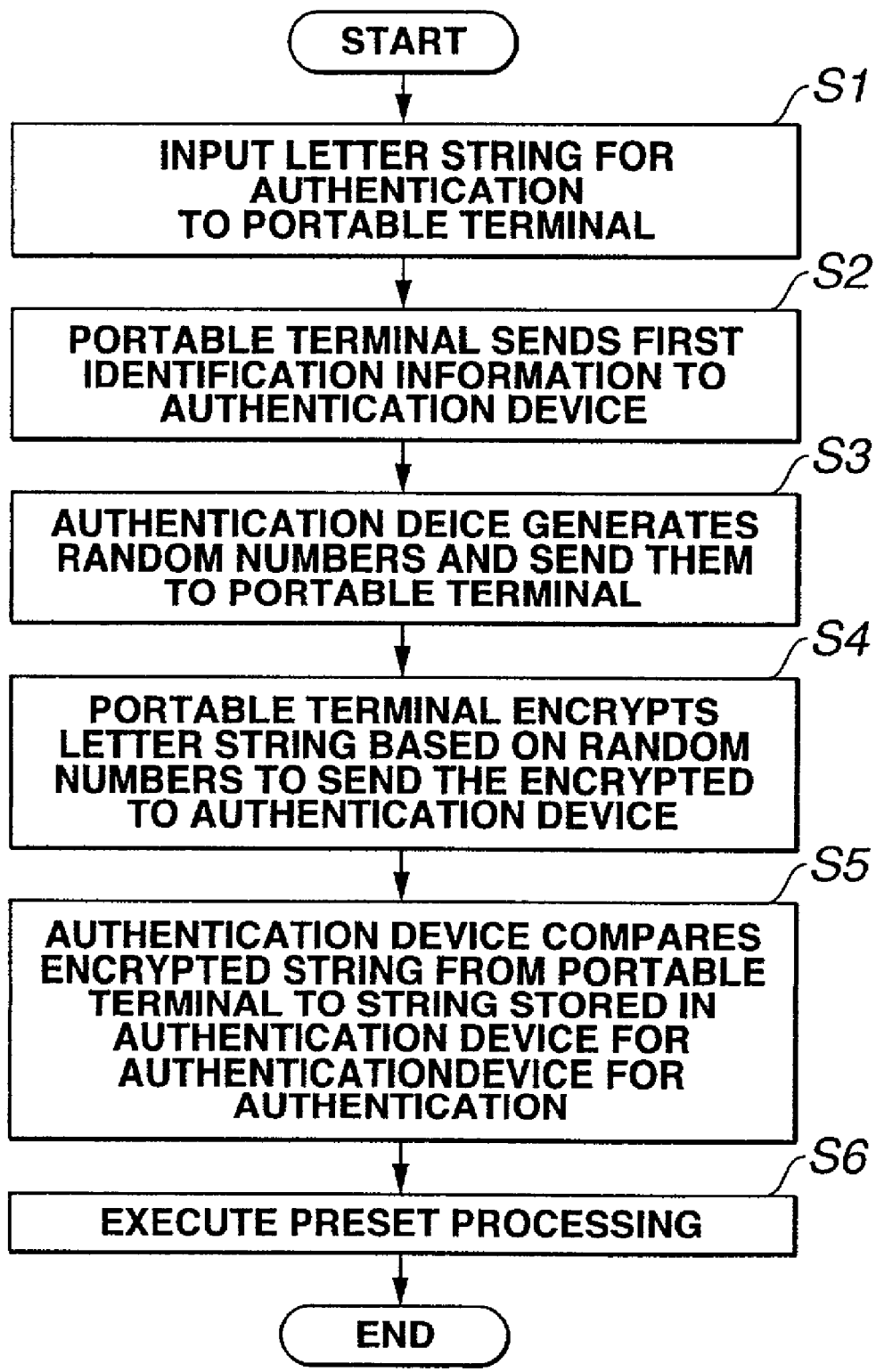
FIG. 1 is a flowchart illustrating the process of authentication of a portable terminal by an authentication device as an exemplary structure of the present invention.

FIG. 1 shows the rudimentary process for an authentication device to authenticate a portable terminal and its owner in an authentication system of the present invention.

When the owner of a portable terminal intends to receive preset services using a portable terminal, he or she inputs the second information to a portable terminal (step S1). The second identification information in this case is a string of letters, such as a secret identification number, accorded to the user of the portable terminal in association with the first identification information. This secret identification number, as the letter string for authentication, and the first identification information, as the identification information proper to the portable terminal, as later explained, are accorded from the service provider at the outset.

The portable terminal transmits the first identification information stored in the first identification information storage unit to the authentication device (step S2). The first information is the information indicating whether or not the portable terminal is being supervised; and it is stored in a second identification information storage unit provided in the authentication device along with the string of letters for identifying the owner of the portable terminal.

When the authentication device acquires the first identification information from the portable terminal and ascertains that the portable terminal is being supervised by the authentication device, the authentication device at step S3 generates the information for encrypting the information (encryption key), such as a random number, and transmits the so-generated random number (step S3) to the portable terminal. The so-generated random number is associated with the first identification information of the portable terminal and provisionally (transiently) stored in the authentication device. This random number is used for encrypting and suppressing the letter string for authentication when the portable terminal sends the letter string for authentication to the authentication device. The letter string for authentication is encrypted at an encrypting unit of the portable terminal based on a preset rule. The rule for encryption may be prepared using pre-existing known encrypting methods. The portable terminal sends the encrypted letter string for authentication to the authentication device (step S4).

On receipt of the encrypted letter string for authentication from the portable terminal, the authentication device compares the letter string for authentication of the owner of the portable terminal stored in association with the first identification information in the second authentication information storage unit provided in the authentication device to the letter string for authentication transmitted encrypted from the portable terminal. When the letter string for authentication from the portable terminal coincides with the letter string for authentication stored in the second identification information storage unit of the authentication device, the person who entered the letter string for authentication at the portable terminal in question is authenticated as the true owner of the portable terminal (step S5).

The comparison of the letter string for authentication of the owner of the portable terminal stored in the second authentication information storage unit in association with the first identification information to the encrypted letter string for authentication is carried out by first decoding the encrypted letter string for authentication, using the random number for encryption stored provisionally (transiently) in the authentication device, and then comparing the decoded results to the letter string for authentication stored in the authentication device.

Alternately, the above-described sequence of operations may be reversed, that is, the letter string for authentication stored in the authentication device may first be encrypted with the random number using the same rule as that used in the portable terminal, with the encrypted results then being compared to the encrypted letter string for authentication from the portable terminal.

By generating a random number each time an owner of a portable terminal intends to enjoy a preset service and by performing encryption based on this random number, the encrypted letter string for authentication transmitted from the portable terminal is represented at all times with different codes, thus improving suppression characteristics.

The portable terminal erases the stored letter string for authentication following the authentication by the authentication device. The authentication device executes preset processing for the authenticated portable terminal (step S6).

There is no particular limitation to the timing at which the portable terminal is connected to the authentication device. That is, the portable terminal may be connected to the authentication device as the letter string for authentication is first input, or the portable terminal may first be connected to the authentication device as a first step and transiently disconnected from and subsequently re-connected to the authentication device after inputting of the letter string for authentication.

In the authentication system of the present invention, the portable terminal is authenticated by the authentication device by the above-described processing. In the authentication system of the present invention, the portable terminal cannot be authenticated by itself by the authentication device, except if the letter string for authentication, such as secret identification number (letter or number), is input by the owner, so that the third party is not in a position to perform illicit acts using only the portable terminal. At any rate, high suppression characteristics are required when the owner inputs the letter string for authentication to the portable terminal.

To this end, the input unit in the authentication system of the present invention for inputting the letter string for authentication as the secret identification number is made up by a display section for irregularly displaying letters included in a preset group of letters and a selection section for selecting letters making up the letter string for authentication from the letters displayed irregularly in the display section. For example, ten numerical figures from 0 to 9 are irregularly displayed at optional positions in the display section for the ten numerical figures of 0 to 9. Moreover, the portable terminal is improved in suppression characteristics because no letter string for authentication used for authentication with respect to the authentication device is held therein.

Thus, the authentication system according to the present invention is an authentication system in which, in the process until authentication of the portable terminal by the authentication device (service provider) when the authentication device verifies whether or not the portable terminal in question is managed by the authentication device, the act of illicit acquisition of the card information or the terminal information by a third party is rendered difficult.

In particular, in the authentication device according to the present invention, it is presupposed that when the user utilizes the credit transaction system employing the credit card or the debit payment service employing the bank's cashing card, the seller who sold a commodity to the service provider or the user authenticates the information of no one other than the user as recorded on the card presented by the user and carries out payment based on such authentication. Consequently, the portable terminal in the instant embodiment is indicated as being a 'card' pre-issued from the service provider to the user, while the service mainly indicates 'payment' at the time of purchasing the commodity.

In distinction from the card used for authenticating the user in this sort of conventional service, the card as the portable terminal has an input unit for inputting the letter string for authentication (secret identification number or secret identification letter) and an information encrypting unit for generating the information for authentication for a host computer based on the preset information encryption information. The information encrypting unit mixes (calculates) a random number and a card ID as the card authentication information pre-stored in the card itself together into a code to form the information for authentication for the host computer. The card input unit, as this portable terminal, has sufficient suppression characteristics for assuring safety when the user inputs the secret identification number.

In short, the card as the portable terminal needs to have input the secret identification number by the card owner, while the function proper to the card for commerce aimed at authentication is not performed with the card itself, such that the card is not authorized by an authentication device with merely a simplified operation of reading the card by a card reader, as in the case of the conventional card.

Figure 2:
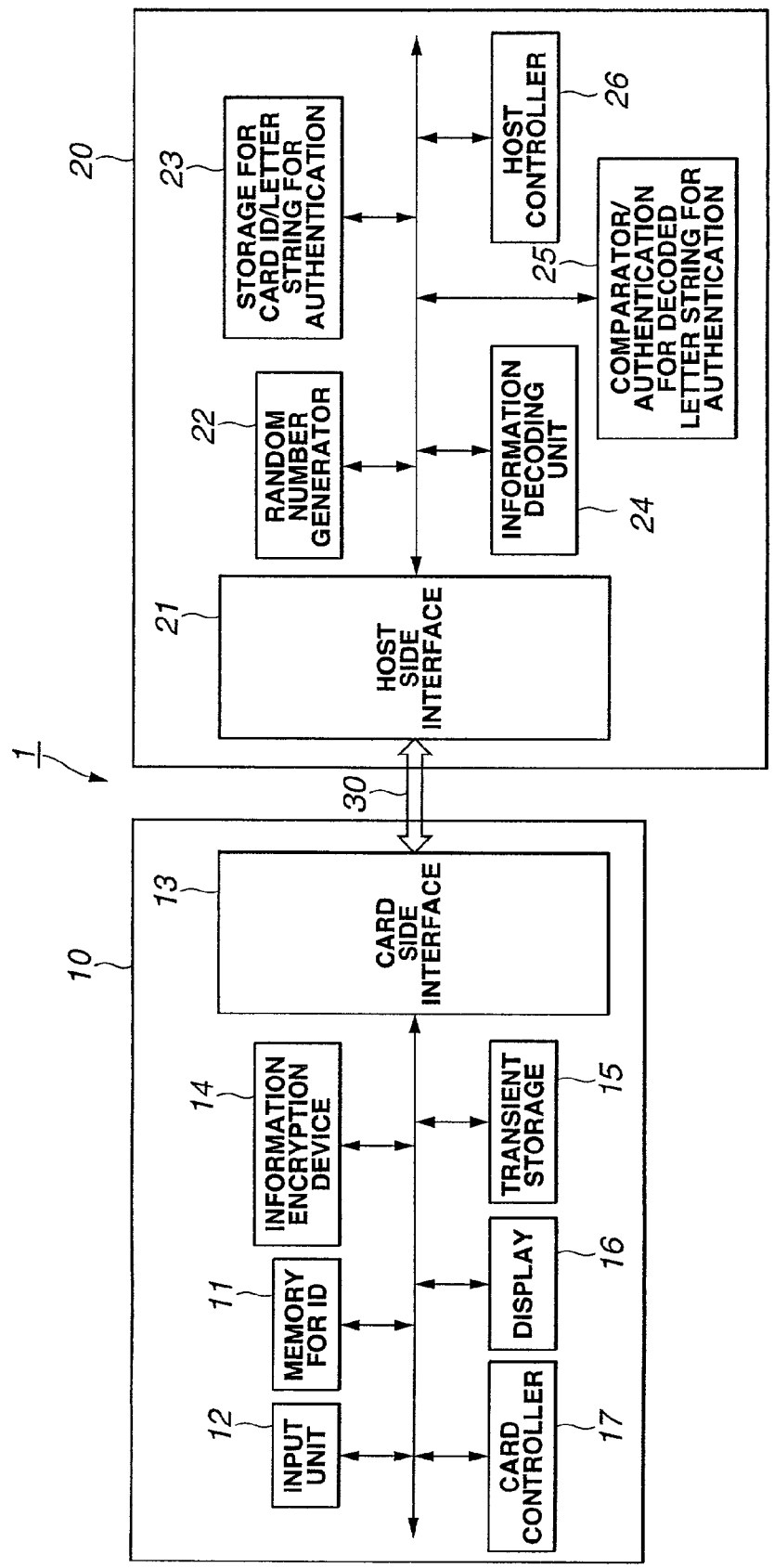
FIG. 2 shows a structure of an authentication system as an exemplary structure of the present invention.

An authentication system 1 is hereinafter explained by referring to the drawings. In FIG. 2, the authentication system 1 is a system for authentication in which a card 10 and a host computer 20, as an authentication device, are interconnected over a connection line 30. When connected to the card 10, the host computer 20 verifies whether or not the card 10 is supervised by the host computer 20 and also acquires the personal information of the card owner stored in the card to authenticate the card 10 and its owner.

The connection line 30 is either a dedicated line for connecting the card to the host computer 20 or the so-called Internet constructed by interconnecting plural networks to form a large-scale network. There may be variegated configurations of interconnecting the card 10 to the host computer 20 over the connection line 30. For example, the host computer 20 may be provided with a connection terminal for connection to the card 10 and connected to the card by the connection terminal and a connection line. In this case, the connection terminal and the host computer 20 are interconnected over a cable or a radio path. The card and the connection terminal may be interconnected with a contact connection with a magnetic readout, the connection terminal or a non-contact connection.

The card 10 is made up by a memory for ID 11 for storing the card ID equivalent to the aforementioned first identification information, an input unit 12 via which the card owner inputs the secret identification number as a letter string for authentication, and a card side interface 13 connected to the host computer 20 over the connection line 30. The card ID is the information required for identifying the card and pre-accorded by the service provider. This card ID does not indicate the direct information specifying no one other than the user. The input unit 12, fed with the secret identification number as the letter string for authentication, is constructed so that the secret identification number of the card owner will not be illicitly acquired by a third party. The details of the input unit 12 will be explained subsequently.

The card 10 also includes an information encryption unit 14, a transient storage unit 15 and a display unit 16. The information encryption unit 14 mixes (calculates) the random number, equivalent to the aforementioned preset encryption generating information, transmitted from the host computer 20 and which has an inherent value each time it is transmitted, and the card ID, as the identification number for the card, into a code to generate the information for authentication for the host computer 20. In the transient storage unit 15, there is transiently stored the secret identification number input from the input unit. The secret identification number stored in the transient storage unit 15 is erased each time the authentication comes to a close or every preset time interval. The display unit 16 may, for example, be a liquid crystal display device. On the display unit 16, there is displayed the information required for inputting by the input unit 12, as an example. A wide variety of encrypting methods may be used for encryption in the information encryption unit 14.

The above components of the card 10 are controlled comprehensively by a card controller 17 having a CPU (Central Processing Unit), a RAM (Random Access Memory) as a work area for the CPU, and a ROM (Read-Only Memory) for storing, e.g., a program designed for carrying out variegated processing operations. The card reader 17 manages the control for transmitting the card ID and the information for authentication to the host computer 20 while erasing the secret identification number stored in the transient storage unit 15 when the letter string for authentication transmitted as the information for authentication is authenticated by the host computer 20. The card controller 17 also is able to erase the memory contents of the transient storage unit 15 at every preset time interval.

Thus, the card 10 encodes the secret identification number with encryption keys different from one communication event with the host computer 20 to another. Moreover, the input secret identification number is not held after the encoding within the card, so that, if the card is stolen by a third party, the card by itself is not authenticated by the host computer 20.

The host computer 20 includes a host side interface 21 connected to the card 10 over the connection line 30, a random number generator 22 generating random numbers, and a storage unit for card ID/letter string for authentication 23 for holding the card ID of the card 10 and the letter string for authentication issued for the card ID in association with each other. The host computer 20 also includes an information decoding unit 24 for decoding the information for authentication to extract the card authentication information and a comparator authentication unit for the decoded letter string for authentication 25 for comparing and authenticating the information for authentication obtained on mixing the random number and the card ID by the information encryption unit 14 in the card 10 and on encoding the resulting mixed signal based on the generated random number. These various components are comprehensively controlled by a host controller 26 having a CPU, a RAM as a work area of the CPU and a ROM for storage of programs, etc., used for carrying out variegated processing operations. The card ID/storage unit for letter string for authentication 23 is adapted for holding the random numbers generated in the random number generator 22 in association with the generated card ID.

It is sufficient if the random number generator 22 generates the encryption key by a preset function at a preset timing. For example, an encryption key generator also may be used in which the inherent value obtained each time by a preset function based on the information obtained from GPS (Global Positioning System) or clocks is used as an encryption key. The host controller 26 associates the card ID sent from the card with the random number issued for the card, in order to store the card ID and the random number transiently in the card ID/storage unit for letter string for authentication 23. The host controller 26 also controls the information decoding unit 24 to extract the card identification information from the information for authentication. In the case of authentication on comparison in the comparator authentication unit for the decoded letter string for authentication 25, the host controller 26 furnishes preset service to the card owner.

In the above-described authentication system 1, the comparison of the letter string for authentication of the owner of the portable terminal stored in the card ID/storage unit for letter string for authentication 23 in association with the card ID to the letter string for authentication encrypted by the information encryption unit 14 (information for authentication) is carried out by decoding the encrypted letter string for authentication (information for authentication) using random numbers transiently stored in the host computer 20 and by subsequently comparing the decoded result with the letter string for authentication stored in the card ID/storage unit for letter string for authentication 23. However, it also is possible to encrypt the letter string for authentication stored in the card ID/storage unit for letter string for authentication 23 under the same rule as that of encryption used in the card and to compare the result to the encrypted letter string for authentication from the card 10.

Figure 3:
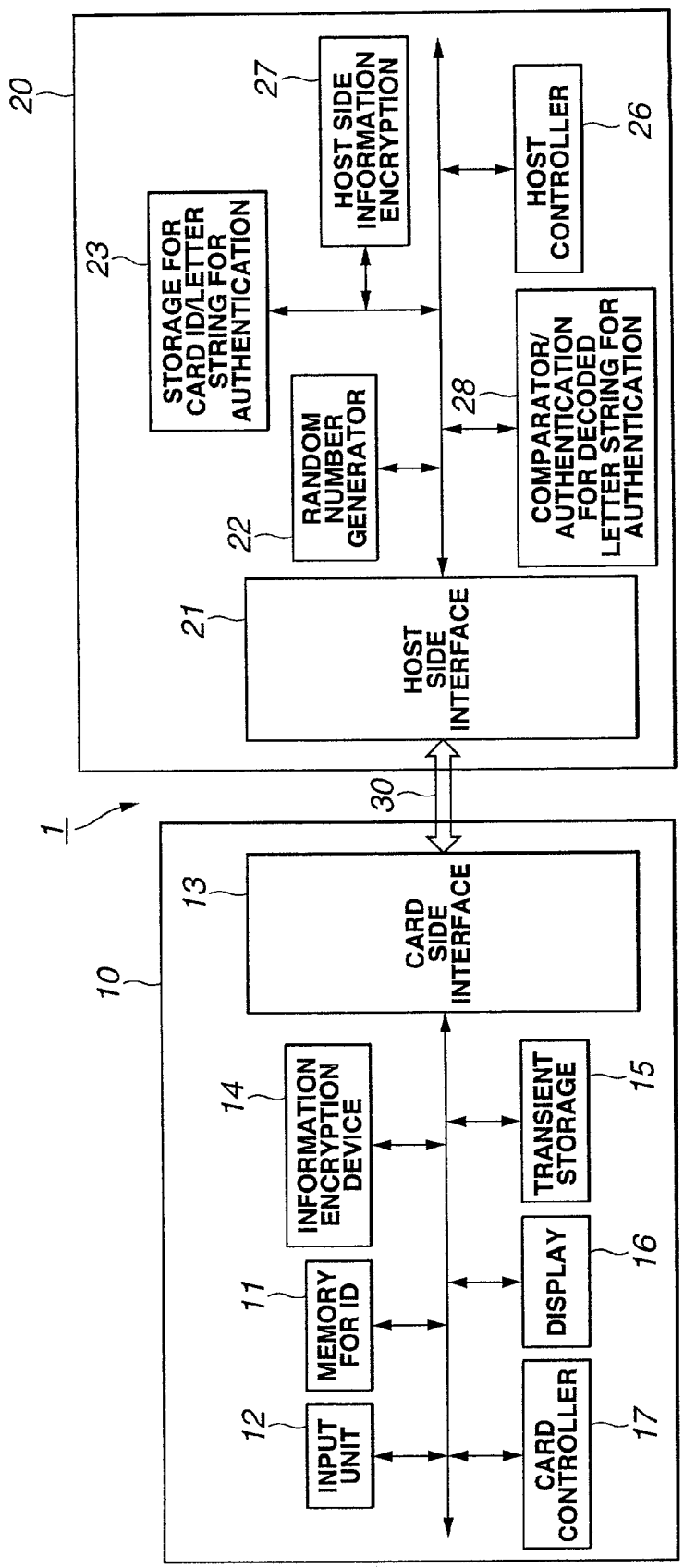
FIG. 3 shows another structure of an authentication system as an exemplary structure of the present invention.

Specifically, the host computer 20 in the authentication system 1 includes a host side encryption unit 27 for encryption under the same rule as that of the information encryption unit 14 in place of the information decoding unit 24, while including a comparator authentication unit for the encoded letter string for authentication 28 in place of the comparator authentication unit for the decoded letter string for authentication 25, as shown in FIG. 3. By encrypting the letter string for authentication stored in the card ID/storage unit for letter string for authentication 23 under the same rule as that of the encoding carried out in the card 10, the information for authentication can be compared and authenticated without decoding the information for authentication.

Figure 4:
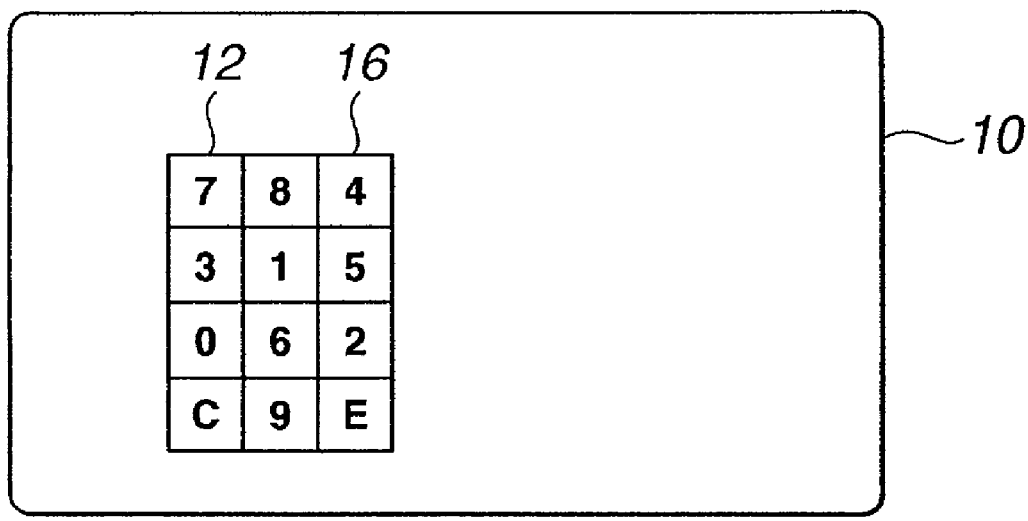
FIG. 4 shows the appearance of a card as a portable terminal in an authentication system as an exemplary structure of a card as a portable terminal in an authentication system as an exemplary structure of the present invention.
Figure 5:
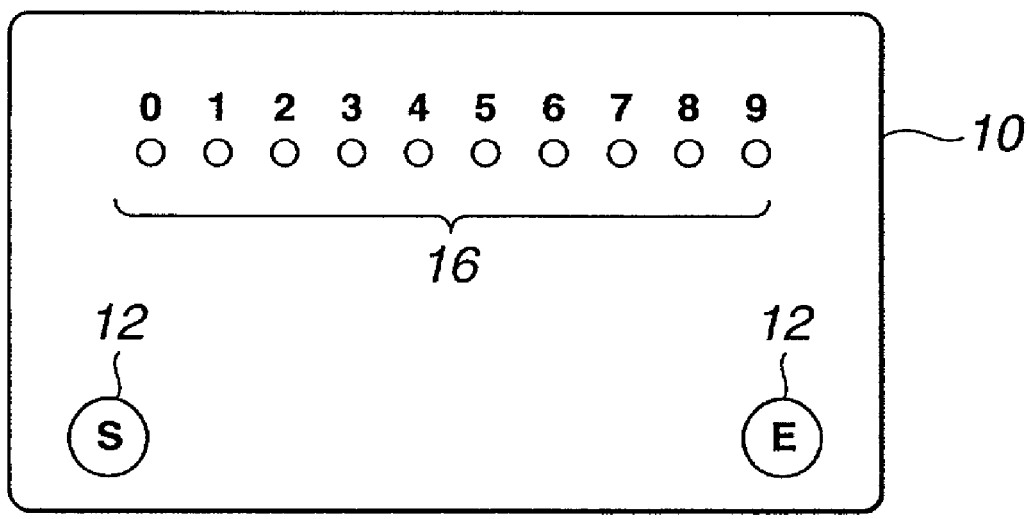
FIG. 5 shows the appearance of another card as a portable terminal in an authentication system as an exemplary structure of a card as a portable terminal in an authentication system as an exemplary structure of the present invention.
Figure 6:
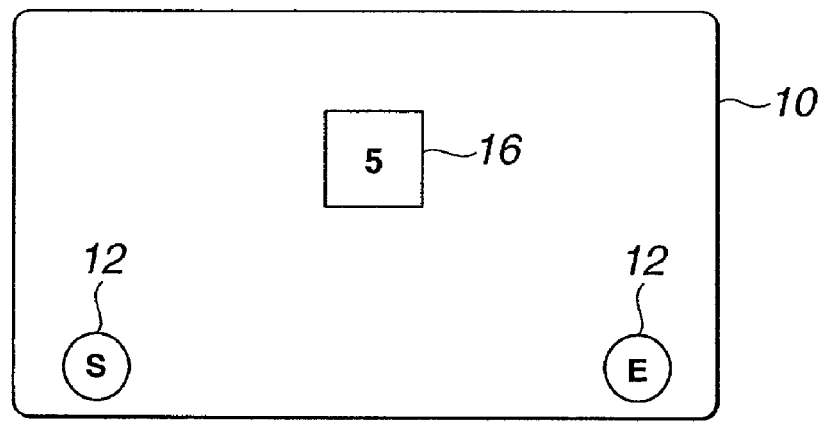
FIG. 6 shows the appearance of a further card as a portable terminal in an authentication system as an exemplary structure of a card as a portable terminal in an authentication system as an exemplary structure of the present invention.

The secret identification number is input from the owner in the input unit 12 of the card 10, as described above. To this end, sufficient suppression characteristics must be guaranteed in the input unit 12 against the third party when the owner inputs the secret identification number. FIGS. 4 to 6 show a specified embodiment of the input unit 12, which enables the secret identification number to be input with high suppression characteristics. Heretofore, in a host computer or a connection terminal for a host computer, the secret identification number is input from a fixed input unit. In this case, it is difficult to suppress the encryption key from a third party at the inputting time. Since the secret identification number can be input to the card, the card owner is able to input the secret identification number into the card 10 at an optional place. That is, the card owner is able to protect his or her secret identification number inputting scene from the eye of the third party. Consequently, the input unit 12 is able to secure confidentiality at the time of inputting the secret identification number.

FIG. 4 schematically shows the appearance of the card 10 provided with the input unit 12 shown as a first embodiment. In the card 10 shown in FIG. 4, the display unit 16 features the ten numerical figures in irregular, optional places of the display unit. The input unit 12 is provided with a contact inputting function of detecting the contacted position and reflecting the position information in the input; and, it is provided in superimposition on corresponding positions of the display unit 16.

In FIG. 4, reference numerals, or figures, 7, 8, 4, 3, 1, 5, 0, 6, 2, C, 9 and E are demonstrated from the upper left end towards the right lower end of the display unit 16. At the next inputting event, the respective numerical figures are displayed at different positions of the display unit 16. In FIG. 4, C and E denote a selection button and an erasure button, respectively. When inputting the secret identification number, the card owner touches desired numerical figures irregularly displayed on the display unit 16 to enter the letter string representing the secret identification number. When the inputting is finished, the card owner presses button C. Button E is used when the input numerical figure is to be corrected or when the letter string input as the secret identification number is to be erased.

When a preset numerical figure is demonstrated at a preset position on the display unit, the same position is acted on each time the card owner inputs the secret identification number. In such a case, as the card is used repeatedly, a problem is raised that the numerical figures used as the secret identification number become known to a third party due to wear and/or contamination of the input unit 12. Moreover, the secret identification number may become known by the movement of the finger pressing the numerical figure on the inputting site. However, in the case of the card 10 having the inputting unit shown in FIG. 4, it is difficult for the numerical figures used as the secret identification number to become known to the third party due to wear, contamination of the input unit 12 or finger movement at the time of input.

Referring to FIG. 5, a second embodiment of the input unit 12 is now explained. In the card 10 shown in FIG. 5, the display unit 16 causes light emission in the numerical figures of 0 to 9 or their vicinity on the card surface to point to the respective numerical figures. The display unit 16 is, e.g., a light emitting means, such as an LED (Light Emitting Diode), and emits light to point to a preset numerical figure. The display unit 16 may sequentially emit light from 0 to 9, from 9 to 0, or irregularly. The light emitting time interval may be constant or varied.

Although the input unit 12 has a selection button S and an erasure button E, the button of the input unit 12 used for selection is only the button S. Since each display unit 16 emits light sequentially or irregularly, it is sufficient if the card owner thrusts the selection button when the desired numerical figure is indicated. In such a case, since the same position is pressed at all times in selecting the letter string as the secret identification number, it is difficult for the numerical figures used as the secret identification number to become known to the third party due to wear, contamination or finger movements at the time of input.

Referring to FIG. 6, a third embodiment of the input unit 12 is hereinafter explained. In the card 10 shown in FIG. 6, the display unit 16 features displaying one of ten numerical figures. The display unit 16 may display the ten numerical figures sequentially or irregularly. The user presses a selection button S of the input unit 12 when the desired numerical figure is displayed to select the desired numerical figure.

In this case, only one button is pressed at all times in selecting the numerical figures in the input unit 12, so that it is difficult for the numerical figures used as the secret identification number to become known to the third party due to wear, contamination or finger movements at the time of input.

In the above-described three embodiments, the suppression properties at the time of inputting the secret identification number may be further raised by setting the angle of view of the display unit 16 to a narrow angle.

Meanwhile, the present invention features a card as a portable terminal having the function of inputting the secret identification number, so that there is no particular limitation to the encrypting method in the signal transmission/receipt between the card 10 and the host computer 20, such that currently available encryption principles, such as an open key encryption system, may be applied. As a typical encryption method, it may be contemplated to use a value obtained on computing and processing of a random number transmitted from the computer 20 as the authentication device to the card 10 and the secret identification number of the card 10 under a preset rule as an encryption key of the card 10 for the host computer 20.

Specifically, a case in which a random number generated by the host computer 20 is a 20-digit figure, the secret identification number of the card 10 is a 4-digit figure, and a four-digit figure made up of the secret identification number and the random number is generated in the information encryption unit 14 of the card 10 as the information for authentication is now explained.

There are 20!, that is, approximately $4 \times 10^{18}$ ways of re-arraying the 20 digit numerical figure sent from the host computer 20 to the card 10 into four sets of numerical figures each comprised of five digit numerical figures. In re-arraying the 20-digit figure into four sets each comprised of five digit numerical figures, such a rule may be adopted in which the first digit of the first five digit figure is the 19th digit figure of the 20-digit random number, the second digit of the first five digit figure is the third digit figure of the 20-digit random number, the third digit of the first five digit figure is the 17th digit figure of the 20-digit random number and the fourth digit of the first five digit figure is the fifth digit figure of the 20-digit random number, with the fifth digit of the first five digit figure being the 15th digit figure of the 20-digit random number.

Next, one digit of the secret identification number made up of four digit numerical figures is inserted into each of the four sets of the five digit numerical figures to create 6-digit numerical figures. It is determined at which of the six possible inserting positions the numerical figure is to be inserted. There are $(10 \times 6)^4$ different ways, that is, approximately $1.3 \times 10^7$ different ways of inserting the numerical figures.

Here, four five-digit numerical figures are determined from the 20-digit random number and multiplied with the six-digit numerical figures prepared as described above. There are $(10^5)^4$, that is, $10^{20}$ different ways of multiplication. By this multiplication, four sets of 11 or 12-digit numerical figures are obtained.

An optional one digit is extracted from the lower ten digits of the 11 or 12-digit numerical figures. The four numerical figures extracted by carrying out the above operations on the four sets of the numerical figures are combined, and the resulting numerical figures are used as the four-digit information for authentication. There are 14 different ways of so combining the numerical figures.

Thus, even in the above-described extremely simple case, approximately $3.1 \times 10^{49}$ information for authentication may be obtained by mixing the 20-digit random number and the four-digit secret identification number. Moreover, since the numerical value to become the ultimate information for authentication is of four digits and is of a smaller value, it may be difficult to counter-reckon the respective numerical figures by several to scores of skimming operations, even though the above-described calculations for encryption should become exposed.

With the above-described input unit 12 of the authentication system 1 for the card 10, it is possible to improve the suppression properties at the time of inputting the secret identification number as the letter string for authentication by the user.

Figure 7:
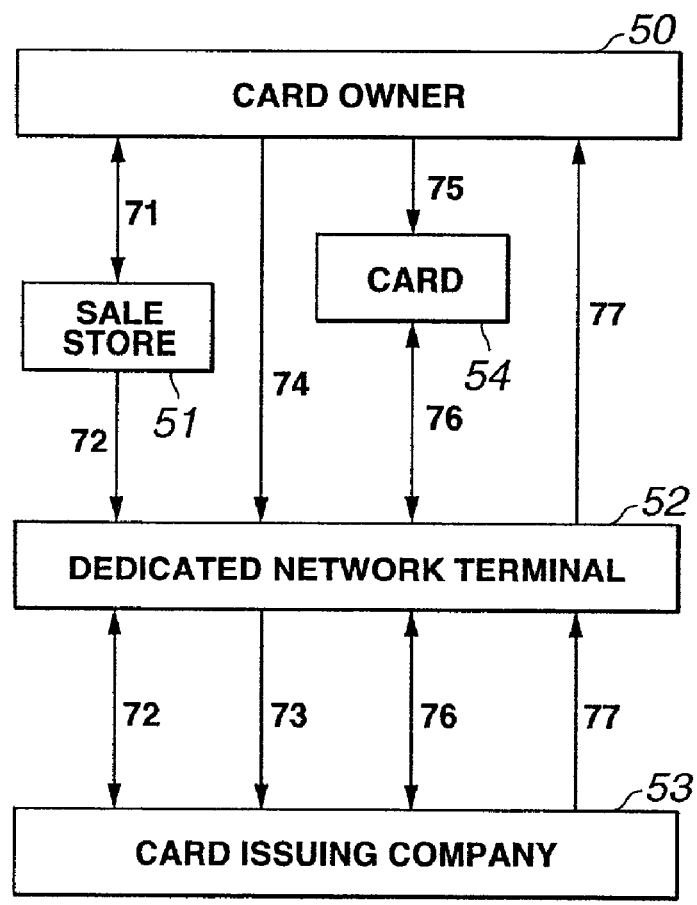
FIG. 7 is a schematic view showing the case of making payment for goods purchased with a card by a card owner in a store.
Figure 8:
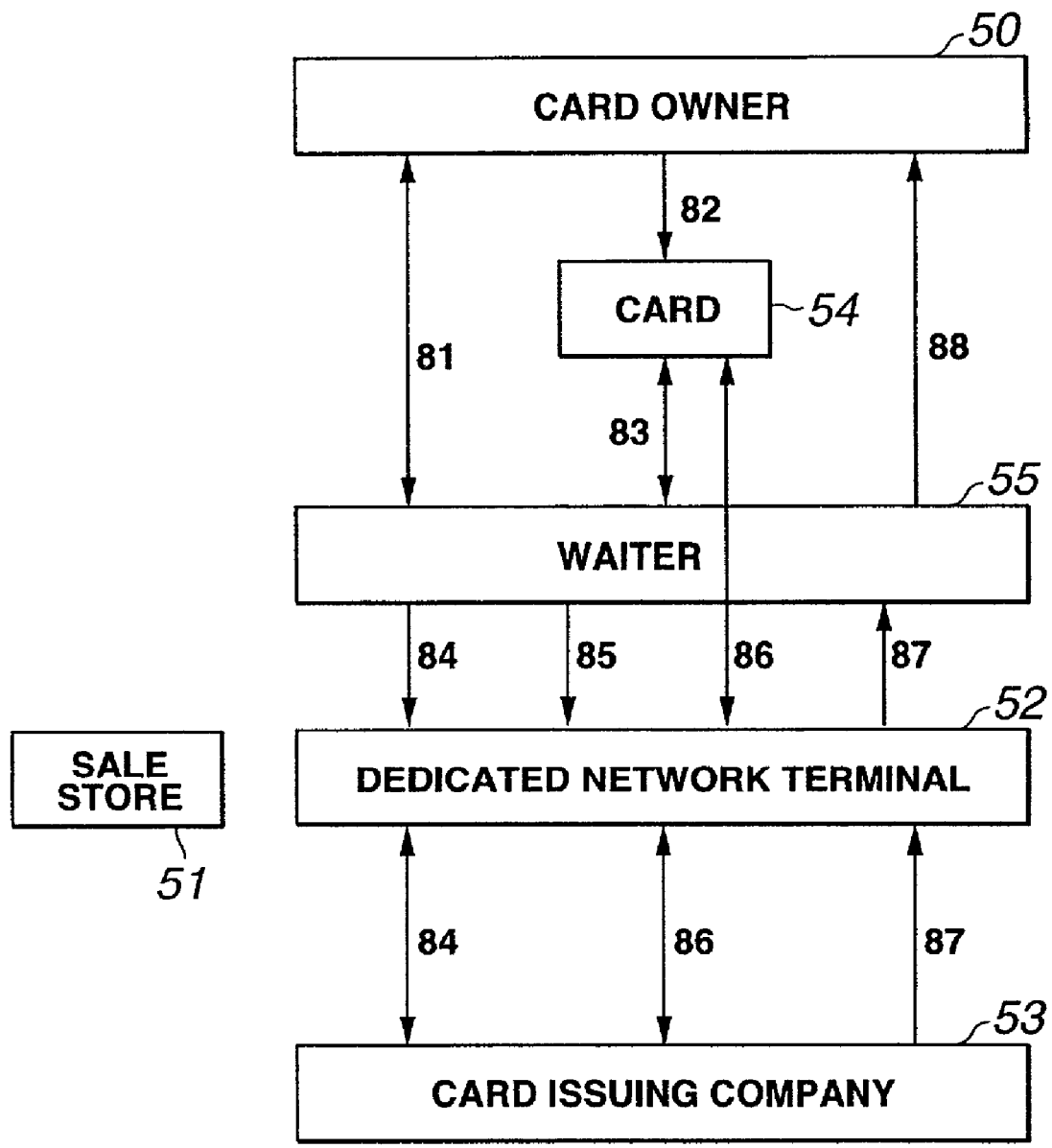
FIG. 8 is a schematic view showing the case of making payment by a card owner at a high class restaurant.

Referring to FIGS. 7 and 8, a specified instance of payment with the use of the above-described authentication system 1 is hereinafter explained. Referring to FIG. 7, the case of making payments for the commodity purchased by a card owner at a store using a card is explained. A card owner 50 selects a commodity at a store 51 (step 71). When the commodity to be purchased is determined and the card owner intends to make payments, the store 51 connects a dedicated network terminal 52 of, e.g., a personal computer (abbreviated to PC) to a card issuing company 53 (step 72) and transmits the information pertinent to commodity information (contents and the amount of the commodity) (step 73). The card owner 50 checks for the commodity information (contents and the amount of the commodity) on the commodity being purchased (step 74) to enter the secret identification number in the card 54 (step 75). The card 54 on which the secret identification number has been input is connected to the dedicated network terminal 52 (step 76). At this time, the above-described payment process is executed. On completion of the payment, a payment end receipt is transmitted from the card issuing company 53 (step 77).

When the card owner inputs the secret identification number to the card, he or she is able to enter the secret identification number in a place outside the sight of a third party. Although the card 54 with the secret identification number entered thereto may be handed to and, thus, may be seen by, e.g., a sale clerk in the course of the payment, it is difficult for a third party to illicitly acquire the secret identification number from the trace of the inputting operations on the card. Even if the card is willfully exchanged, the encryption information is unique to each event of the transmission, so that the encryption information generated on encryption is invalid for any other communication event, and hence it is difficult for any third party to illicitly acquire the private information.

The case of a card owner making payments in a high-class restaurant using a card is explained with reference to FIG. 8. Although the payment at a high-class restaurant is here explained, it is assumed that, in the payment configuration shown in FIG. 8, the card 54 is transiently handed to a third party, such as a waiter 55. The card owner 50 confirms, e.g., the accounting specifications presented by the waiter to enter an amount, such as tips (step 81). The card owner 50 also enters the secret identification number on the card 54 (step 82) and hands the card 54 along with the accounting specifications to the waiter (step 83). The waiter 55, who has received the card 54 from the card owner 50, connects the dedicated network terminal 52, such as a PC, installed in the sale store, here the high-class restaurant 51, to the card issuing company 53, to transmit the information pertinent to the commodity (information pertinent to the contents of the commodity and the amount) (step 84). The waiter then connects the card 54, handed by the card owner 50, to the network terminal 52 (step 85). The above-described payment process is now carried out (step 86). On completion of the payment, a receipt indicating payment completion is transmitted from the card issuing company 53 (step 87). The waiter 55 then returns the card 54 along with the receipt indicating the payment completion to the card owner 50 (step 88).

In this case, the card owner is again able to enter the secret identification number on a card in a place outside the sight of a third party. Although the card 54 with the secret identification number entered thereto may be handed to and, thus, may be seen by, e.g., a sale clerk in the course of the payment, it is difficult for a third party to illicitly acquire the secret identification number from the trace of then past inputting operations left on the card. Even if the card is willfully exchanged, the encryption information is unique to each event of the transmission, such that the encryption information generated on encryption is invalid for any other communication event, and hence it is difficult for any third party to illicitly acquire the private information.

Figure 9:
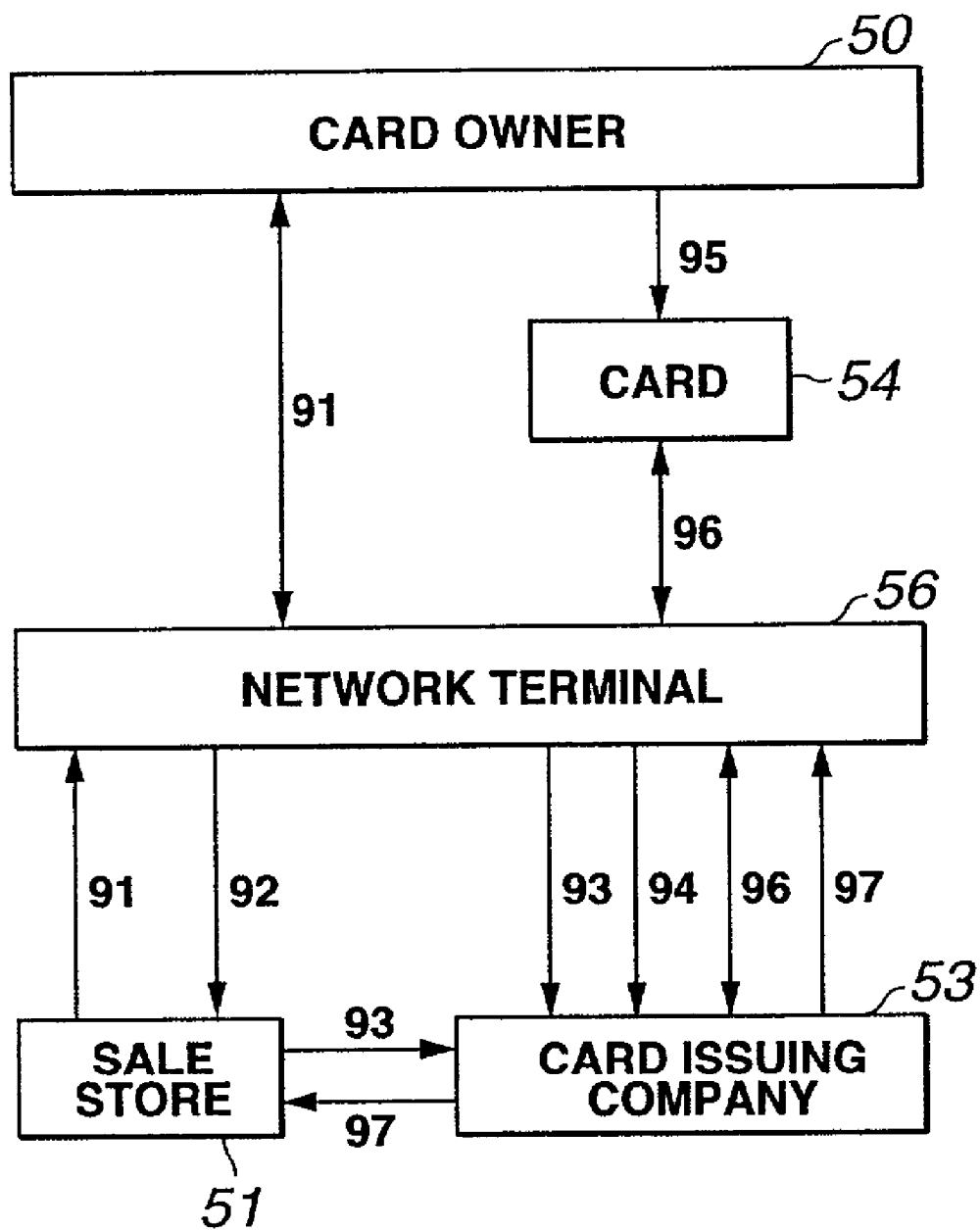
FIG. 9 is a schematic view showing the case of making payment by a card owner over the Internet via a network terminal such as a PC.

The case of a card owner making payments over the Internet using a card is now explained with reference to FIG. 9. It is assumed here that the terminal, such as a PC, connected to the Internet is provided with a readout device loaded with the card 54 and that is adapted to read out the card information. It is also assumed here that the card owner 50 uses the PC installed on his premises, however, the card owner also may use a PC installed at a store and that is connected to the Internet. The card owner 50 selects the commodities sold by the sale store 51 on the Internet through a network terminal 56, such as a PC, connected to the Internet (step 91). The card owner 50 then selects the card issuing company from whom the services to the card owner are offered (step 92). The card owner 50 then transmits the commodity information (the information pertinent to the commodity contents and amount) (step 93). The commodity information also is transmitted from the store 51 to the card issuing company 53. The card owner 50 then confirms the commodity information (step 94). The card owner 50 inputs the encryption number to the card 54 (step 95). The above-described payment process is executed (step 96). The card issuing company 53 transmits the information indicating the completion of payment (step 97).

In this case, the card owner is again able to enter the secret identification number on a card in a place out of sight of a third party. Even though the PC is installed, e.g., at a store for use by a large number of users, some form of the private information may be left within the PC, and the private information may be intercepted in the course of the information transmission/reception over the Internet; however, the encryption information is unique to each event of the transmission, so that the encryption information generated on encryption is invalid for any other communication event, and hence it is difficult for any third party to acquire illicitly the private information.

It may be seen from above that, in the case where the authentication system 1 as an illustrative structure of the present invention is applied to the credit sale system or an inter-account instant decision system, which is carried out over a dedicated network, the result is improved suppression properties on the occasion of a user inputting the secret identification number as the letter string for authentication. This removes anxiety from users at large about the reliability in card exploitation to increase the number of latent users of the credit sale system employing a card, an inter-account instant payment system, a cash card, and E-commerce carried out over an optional network, such as Internet, thus enlarging the market while improving the profitability of business.

It is to be noted that the present invention is not limited to the above-described embodiments, but it may be modified in a number of ways without departing from its scope. For example, although the portable terminal in the authentication system 1 shown as an illustrative structure of the present invention is a card having an encoding circuit, the portable terminal also may be a PDA (Personal Digital Assistant), a portable telephone set or a portable PC in place of the card. Similarly to the card information in a credit card or a debit card, the private information stored in the portable telephone set, PDA or the PC is information that is not to be leaked to a third party. The use of a portable terminal by a user in making payment may be envisioned readily, as exemplified by a user shopping in a certain store and making payments using the private information stored in his or her portable telephone set. In such a case, authentication may be carried out with an authentication device by the processing shown in FIG. 1.

Consequently, even in an authentication system employing a portable terminal other than a card, it is possible to render difficult the unauthorized acquisition by a third party of the terminal information or the private information in the course of the procedure up to the authentication of a user by a service provider.

What is claimed is:

1. An authentication system, said authentication system comprising:
    a portable card terminal, including:
        first identification information storage means having a first identification information stored therein for discriminating said portable card terminal, said first identification information comprising a portable card terminal identifier that uniquely identifies the portable card terminal,
        operating means for inputting a second identification information associated with said first identification information,
        encryption means for encrypting the second identification information input by said operating means based on encryption key information, and
        first communication means for communication with an authentication device, wherein said communication includes transmitting the first identification information to said authentication device and receiving said encryption key information from the authentication device in response to transmitting the first identification information;
    said authentication device, provided independently of said portable card terminal for communication with said portable card terminal, the authentication device including:
        second identification information storage means for storage of the first identification information and the second identification information therein,
        encryption key information generating means for generating said encryption key information, wherein said encryption key information comprises a random number, and wherein said encryption key information is generated in response to receiving the first identification information from said portable terminal,
        second communication means for communication with said portable card terminal, and comparator authentication means for comparing and authenticating the second identification information encrypted by said encryption means based on said encryption key information;

wherein said portable card terminal encrypts the second identification information input from said operating means, based on said encryption key information received from said authentication device, the so-encrypted second identification information is transmitted through said first communication means to said authentication device; and wherein, in said authentication device, the encrypted second identification information received through said second communication means and the second identification information stored by said second identification information storage means are compared to each other based on said encryption key information to perform the authentication; and wherein said portable card terminal includes a transient storage means for storing the second identification information input by said operating means until authentication of said portable card terminal by said authentication device.

2. The authentication system according to claim 1 wherein said authentication device includes:
decoding means for decoding the second identification information encrypted by said encrypting means based on said encryption key information,
said authentication device decoding the received encrypted second identification information based on said encryption key information, said authentication device comparing the decoded second identification information to the second identification information stored in said second identification information storage means, by way of performing the authentication.

3. The authentication system according to claim 2, wherein said second identification information is a password of a service user made up of a preset letter string or a preset string of numerical figures.

4. The authentication system according to claim 3 for authenticating the service user to whom preset services are offered from a service provider in a credit sale system, an inter-account instant payment system and in E-commerce carried out over a preset network, wherein
said portable card terminal is a card-shaped portable terminal issued by said service provider to said service user,
said authentication device being contained in a host computer in which said service provider authenticates usage by said service user, and
said service user being authenticated by said authentication device authenticating said portable card terminal and that said service user is a true owner of the portable card terminal.

5. The authentication system according to claim 4, wherein said first and second communication means are wireless communication means.

6. The authentication system according to claim 4, wherein said operating means in said portable card terminal includes a plurality of input locations respectively used for indicating letters or numerical figures for inputting said second identification information, and wherein the input locations corresponding to individual ones of the letters or numerical figures are variable, such that individual ones of the letters or numerical figures are resident at one of the plurality of input locations when said second identification information is input a first time, and are resident at another of the plurality of input locations when said second identification information is input a second time.

7. The authentication system according to claim 6, wherein the plurality of input locations are varied prior to the inputting of said second identification information.

8. The authentication system according to claim 4, wherein said operating means in said portable card terminal includes a display unit for displaying letters and a selection unit for selecting the letters displayed on said display unit, and wherein the second identification information input by said operating means is made up by a string of letters selected by said selection unit from among plural letters sequentially displayed on said display unit.

9. The authentication system according to claim 1, wherein said second identification information stored in said transient storage means is erased every preset time interval.

10. The authentication system according to claim 1, wherein said operating means in said portable card terminal includes means for erasing the second identification information stored in said transient storage means.

11. An authentication method in which a portable card terminal is authenticated by an authentication device provided independently of said portable card terminal, said method comprising
an operating step of inputting a second identification information associated with a first identification information that discriminates said portable card terminal and that is stored in a first identification information storage means of said portable card terminal, said first identification information comprising a portable card terminal identifier that uniquely identifies the portable card terminal,
an encryption key information generating step of generating an encryption key information by transmitting the first identification information from the portable card terminal to the authentication device, and receiving said encryption key information from the authentication device in response to transmitting the first identification information, wherein said encryption key information is generated by the authentication device in response to receiving the first identification information from the portable card terminal,
an encrypting step of encrypting the second identification information input at said operating step, based on the encryption key information generated in said encryption key information generating step, and
a comparison authentication step of comparing the second identification information encrypted in said encrypting step to the second identification information as stored in a second identification information storage means to perform the authentication, and
a transient storage step of transiently storing the second identification information input in said operating step until authentication of said portable card terminal by said authentication device.

12. The authentication method according to claim 11 further comprising
a decoding step of decoding the second identification information, encrypted in said encrypting step, based on said encryption key information,
the encrypted second identification information being decoded in said decoding step based on said encryption key information, and the decoded second identification information being compared to the second identification information stored in said second identification information storage means by way of performing the authentication.

13. The authentication method according to claim 12, wherein the encryption key information comprises a random number.

14. The authentication method according to claim 13 for authenticating a service user to whom preset services are offered from a service provider in a credit sale system, an inter-account instant payment system and in E-commerce carried out over a preset network, wherein
said portable card terminal is a card-shaped portable terminal issued by said service provider to said service user,
said authentication device being an authentication device contained in a host computer in which said service provider authenticates usage by said service user, and
said service user being authenticated by said authentication device authenticating said portable card terminal and that said service user is a true owner of the portable card terminal.

15. The authentication method according to claim 14, wherein said portable card terminal and the authentication device are interconnected by wireless communication means.

16. The authentication method according to claim 14, wherein inputting said second identification information comprises using a plurality of input locations respectively indicating letters or numerical figures for inputting said second identification information, and wherein the input locations corresponding to individual ones of the letters or numerical figures are variable, such that individual ones of the letters or numerical figures are resident at one of the plurality of input locations when said second identification information is input a first time, and are resident at another of the plurality of input locations when said second identification information is input a second time.

17. The authentication method according to claim 16, wherein the plurality of input locations are varied prior to inputting of said second identification information.

18. The authentication method according to claim 14, wherein said operating step includes a display step of displaying letters and a selection step of selecting the letters displayed in said display step, and wherein the second identification information input by said operating step is made up by a string of letters selected in said selection step from among plural letters sequentially displayed in said display step.

19. The authentication method according to claim 11, wherein said second identification information stored in said transient storage step is erased every preset time interval.

20. The authentication method according to claim 11, wherein said operating step includes a step of erasing the second identification information stored in said transient storage step.

21. A portable card terminal authenticated by an authentication device, comprising,
first identification information storage means for storing a first identification information for discriminating said portable card terminal, said first identification information comprising a portable card terminal identifier that uniquely identifies the portable card terminal,
operating means for inputting a second identification information associated with said first identification information,
communication means for communication with said authentication device wherein said communication including transmitting the first identification information from the portable card terminal to the authentication device, and receiving encryption key information from the authentication device in response to transmitting the first identification information, and
encrypting means for encrypting the second identification information input by said operating means based on said encryption key information received from said authentication device, wherein said encryption key information is generated by the authentication device in response to receiving the first identification information from the portable card terminal, and
transient storage means for storing the second identification information input by said operating means until authentication of said portable card terminal by said authentication device.

22. The portable card terminal according to claim 21, wherein said encryption key information comprises a random number.

23. The portable card terminal according to claim 21, wherein the portable card terminal is issued to a service user by a service provider to offer preset services for said service user in a credit sale system, an inter-account instant payment system and E-commerce carried out over a preset network and is in the form of a card.

24. The portable card terminal according to claim 23, wherein said communication means are wireless communication means.

25. The portable card terminal according to claim 23, wherein said operating means includes a plurality of input locations respectively used for indicating letters or numerical figures for inputting said second identification information, and wherein the input locations corresponding to individual ones of the letters or numerical figures are variable, such that individual ones of the letters or numerical figures are resident at one of the plurality of input locations when said second identification information is input a first time, and are resident at another of the plurality of input locations when said second identification information is input a second time.

26. The portable card terminal according to claim 25, wherein the plurality of input locations are varied prior to the inputting of said second identification information.

27. The portable card terminal according to claim 23, wherein said operating means includes a display unit for displaying letters and a selection unit for selecting the letters displayed in said display unit, and wherein the second identification information input by said operating means is made up by a string of letters selected in said selection unit from among plural letters sequentially displayed on said display unit.

28. The portable card terminal according to claim 21, wherein said second identification information stored in said transient storage means is erased every preset time interval.

29. The portable card terminal according to claim 21, wherein said operating means in said portable card terminal includes means for erasing the second identification information stored in said transient storage means.

30. An authentication system made up by a portable card terminal and an authentication device provided independently of said portable card terminal for communication with said portable card terminal, said authentication system comprising:
said portable card terminal, including
first identification information storage means having a first identification information stored therein for discriminating said portable card terminal, said first identification information comprising a portable card terminal identifier that uniquely identifies the portable card terminal,
operating means including display means for irregularly displaying letters included in a group of letters and selection means for selecting the letters making up a second identification information from among the letters irregularly displayed on said display means, said operating means inputting the second identification information associated with said first identification information, encryption means for encrypting the second identification information input by said operating means based on an encryption key information, and first communication means for communication with said authentication device, wherein said communication includes transmitting the first identification information to said authentication device and receiving said encryption key information from the authentication device in response to transmitting the first identification information;

said authentication device, including second identification information storage means having the first identification information and the second identification information stored therein, encryption key information generating means for generating said encryption key information, wherein said encryption key information is generated in response to receiving the first identification information from said portable terminal, second communication means for communication with said portable card terminal, and comparator authentication means for comparing the second identification information encrypted by said encryption means to the second identification information stored in the second identification information storage means; wherein said portable card terminal encrypts the second identification information input from said operating means, based on said encryption key information received from said authentication device through said first communication means, and the so-encrypted second identification information is transmitted through said first communication means to said authentication device; and wherein, in said authentication device, the encrypted second identification information received through said second communication means and the second identification information stored by said second identification information storage means are compared to each other based on said encryption key information to perform the authentication; and wherein said portable card terminal includes a transient storage means for storing the second identification information input by said operating means until authentication of said portable card terminal by said authentication device.

* * * * *